(12) United States Patent
Brunet et al.

(10) Patent No.: US 6,506,702 B2
(45) Date of Patent: Jan. 14, 2003

(54) PROCESS AND VESSEL FOR REGENERATION OF A CATALYST INCLUDING MONITORING AND MONITORING AND CONTROL OF COMBUSTION COMPLETION

(75) Inventors: François-Xavier Brunet, Vernaison (FR); Emmanuelle Bromet, Rueil Malmaison (FR); Jean-Marie Deves, Vernouillet (FR); Dominique Humeau, Vienne (FR); Eric Sanchez, Rueil Malmaison (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 09/811,693

(22) Filed: Mar. 20, 2001

(65) Prior Publication Data

US 2001/0049329 A1 Dec. 6, 2001

Related U.S. Application Data

(63) Continuation of application No. 09/059,407, filed on Apr. 14, 1998, now Pat. No. 6,239,055.

(30) Foreign Application Priority Data

Apr. 14, 1997 (FR) .............................. 97 04661
Apr. 14, 1997 (FR) .............................. 97 04659

(51) Int. Cl.[7] .............................. B01J 38/00
(52) U.S. Cl. .............................. 502/37; 502/38; 502/43; 502/49; 502/52
(58) Field of Search .............................. 502/37, 38, 43, 502/49, 52

(56) References Cited

U.S. PATENT DOCUMENTS

| 4,007,131 A | * | 2/1977 | Gillespie et al. | ............... 502/52 |
| 4,872,970 A | | 10/1989 | Boyle | ......................... 208/140 |
| 5,053,371 A | | 10/1991 | Williamson | ................... 502/37 |

FOREIGN PATENT DOCUMENTS

| EP | 0 258 137 | 3/1988 |
| EP | 0 378 482 | 7/1990 |
| FR | 2 642 330 | 8/1990 |

* cited by examiner

Primary Examiner—Steven Bos
(74) Attorney, Agent, or Firm—Millen, White, Zelano & Branigan, P.C.

(57) ABSTRACT

The invention concerns a process for regenerating a catalyst in a fixed bed, for example a catalyst for reforming or for aromatic compound production, including a step for monitoring and controlling combustion completion which is carried out after the catalyst has undergone all of the combustion steps of the process. The monitoring and control step is carried out by injecting an oxygen-containing gas into the zone where monitoring and control takes place, the monitoring and control step being carried out under conditions which are more severe than those in the combustion steps. The monitoring and control step is carried out with an oxygen consumption of less than 10%. The temperature advantageously remains substantially constant.

11 Claims, 3 Drawing Sheets

Figure 1:
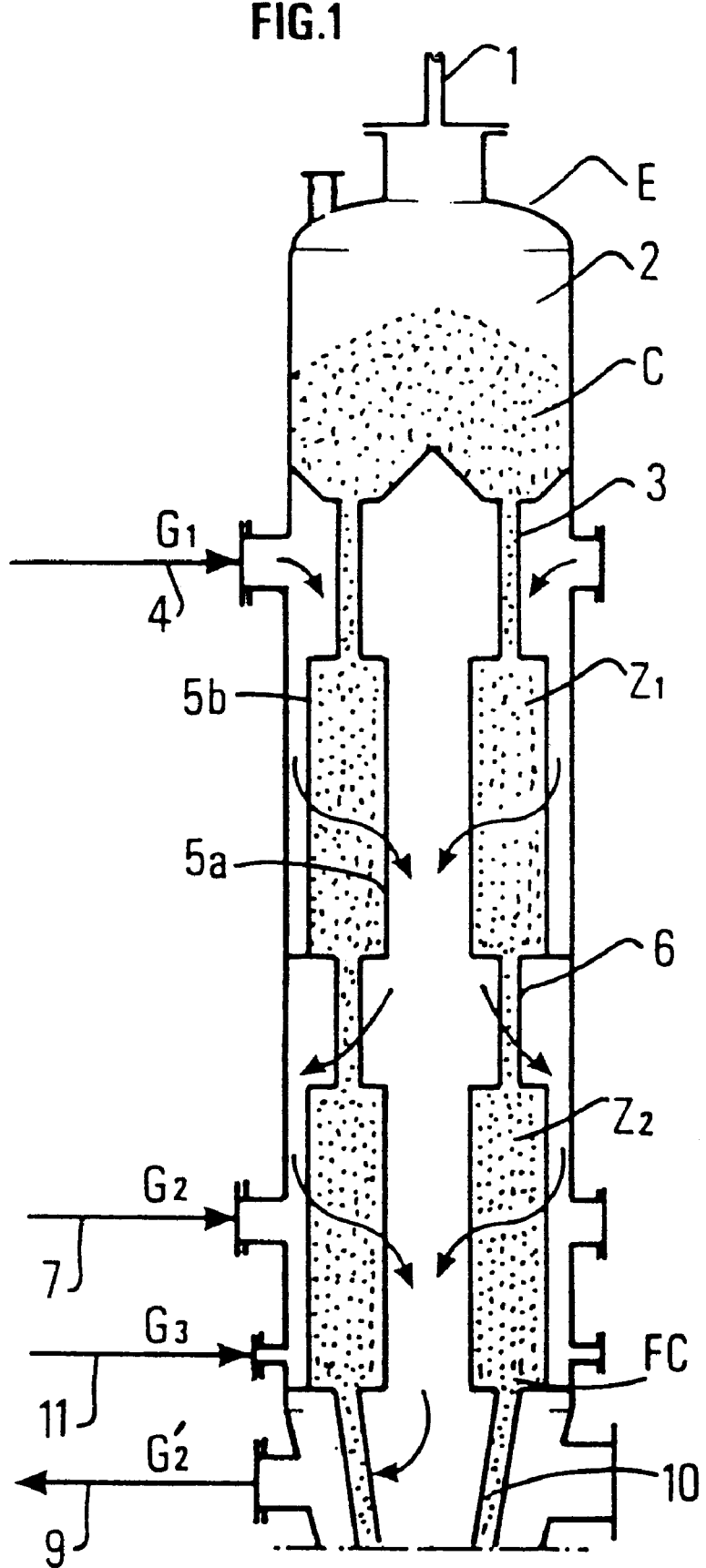

PROCESS AND VESSEL FOR REGENERATION OF A CATALYST INCLUDING MONITORING AND MONITORING AND CONTROL OF COMBUSTION COMPLETION

CROSS REFERENCE TO RELATED APPLICATION

This application is a continuation of application Ser. No. 09/059,407 filed Apr. 14, 1998, now U.S. Pat. No. 6,239,055.

FIELD OF THE INVENTION

The invention relates to processes for regenerating used catalysts intended to restore their initial catalytic performances. More particularly, it concerns the combustion step.

It is of particular application to catalysts for the production of aromatic compounds, in particular for reforming. As compared to Applicants' parent application wherein the claims recite a moving bed, the present aspect of the invention relates to a fixed bed of catalysts.

BACKGROUND OF THE INVENTION

Catalysts for aromatic compound production or for reforming generally comprise a support (for example, formed from at least one refractory oxide, the support possibly also including one or more zeolites), at least one noble metal (preferably platinum), at least one promoter metal (for example tin or rhenium), at least one halogen and possibly one or more additional elements (such as alkalis, alkaline-earths, lanthanides, silicon, elements from group IVB, non noble metals, elements from group IIIA, etc . . . ). Catalysts of that type contain, for example, platinum and at least one other metal deposited on a chlorinated alumina support. In general, those catalysts are used to convert naphthenic or paraffinic hydrocarbons which can be transformed by dehydrocyclisation and/or dehydrogenation; by reforming or for the production of aromatic hydrocarbons (for example the production of benzene, toluene, ortho-, meta- or para-xylenes). Those hydrocarbons originate from fractionation of crude oil by distillation or other transformation processes.

Such catalysts have been widely described in the literature.

Regeneration of such catalysts is also well known. It is carried out in a fixed or moving bed, with a combustion step carried out in one or more combustion zones, then an oxychlorination step, followed by a calcining step. Our European patent EP-A-0 378 482 describes such a moving bed process.

In order to facilitate comprehension, the process of the invention will be described with respect to moving bed regeneration of reforming catalysts. Reference should first be made to the prior art of EP-A-0 378 482.

According to EP-A-0 378 482, the used catalyst slowly moves from top to bottom of a regeneration vessel where it successively comes into contact with a first radial moving bed combustion zone, a second radial moving bed combustion zone, an axial oxychloration moving bed zone and an axial calcining moving bed zone; and:

a) in the first combustion zone, the catalyst is treated at a pressure of 3 to 8 bars, substantially equal to that in the first reforming reactor, at a temperature in the range 350° C. to 450° C., using a combustion gas based on an inert gas circulating radially in a counter-current to the catalyst, comprising 0.01% to 1% by volume of oxygen, the combustion gas originating from a zone for washing the gases from the calcining, oxychlorination and combustion zone;

b) in a second combustion zone, the catalyst is treated at a pressure of 3 to 8 bars, substantially equal to that in the first reactor, at a temperature which is at least 20° C. higher than the temperature in the first combustion zone, in the presence of gases originating from the first combustion zone and in the presence of an inert makeup gas to which up to 20% by volume of oxygen is added to that the catalyst is in contact with a gas comprising 0.01% to 1% by volume of oxygen, the gases circulating radially and in a co-current with the catalyst.

The catalyst is then sent to the oxychlorination zone.

We have established that when carrying out this regeneration process, it is important that combustion is terminated (complete) before passing to the oxychlorination step (or any other subsequent step). If not, the combustion conditions must be modified to achieve it.

As a result, we have developed a process for regenerating a catalyst, the process including a zone for monitoring and controlling combustion completion, before any subsequent step, using means for monitoring and controlling the end of combustion.

We are aware of U.S. Pat. No. 4,578,370 which describes a temperature adjusting zone, after the combustion step and before the oxychlorination step in a process for regenerating a reforming catalyst.

In that process, the gas supplied to the combustion zone circulates radially in the catalyst bed, and the oxygen for combustion originates essentially from the calcining zone located in the bottom of the regeneration zone, after the combustion zone.

The temperature adjusting zone modifies the temperature of the catalyst leaving the combustion zone to bring it to a temperature close to that in the oxychlorination zone, to reduce the thermal shock undergone by the catalyst as it enters the oxychlorination zone.

In order to achieve this, a gas is injected into the temperature adjusting zone, the gas being a compressed portion of the effluent from the combustion step.

That gas is at the temperature of the compressed effluent from the combustion step. It has neither been cooled nor re-heated since one of the aims of that process is not to use heating means, and in general to reduce the amount of equipment required.

The gas entering the temperature adjusting zone mixes at the bed outlet with the gas from the oxychlorination zone and rises, mixing with combustion fumes, up to the head of the regeneration vessel from which it is extracted.

When passing through the temperature adjusting zone, the gas heats the catalyst.

The present invention proposes a process including a zone located after combustion has been carried out, but this zone can overcome a different problem (monitoring and controlling the end of combustion) using means which are not used in U.S. Pat No. 4,578,370.

SUMMARY OF THE INVENTION

More precisely, the present invention concerns a process for regenerating a used catalyst including combustion of carbonized material, in at least one combustion step in which the catalyst is brought into contact with at least one oxygen-containing gas, under pre-determined operating conditions, the process being characterized in that the catalyst which has undergone all of the combustion steps is, in a monitoring and control step, brought into contact with at least one oxygen-containing gas, called monitoring and control gas, under conditions which are more severe than those of the combustion steps, and in that the monitoring and control step is carried out with an oxygen consumption of less than 10% of the oxygen entering with said gas.

The severity of the conditions in the monitoring and control zone is achieved by introducing by means of the monitoring and control gas, a quantity of oxygen which is at least equal to the largest quantity of oxygen introduced into a combustion step and/or by introducing the monitoring and control gas at a temperature which is higher than that of the gases introduced into the combustion step. The first method is preferred.

The monitoring and control step is advantageously carried out at a substantially constant temperature.

The term "substantially constant temperature" means a temperature which does not vary by more than 3%, preferably not more than 2%, excluding measuring errors and heat losses. The monitoring and control gas temperature is advantageously at least equal to that of the highest temperature of the gas(es) introduced into the combustion step. It is preferably higher.

The temperature is preferably of the same order of magnitude as the temperature of the gases and/or the catalyst leaving the last combustion zone.

Monitoring and control is advantageously carried out on the monitoring and control gas leaving the process independently of the other gases from the combustion step after passage over the catalyst. It can also readily be carried out on a monitoring and control gas leaving as a mixture with at least one gas from at least one combustion step.

The used catalyst is regenerated, for example in a fixed bed or in a moving bed, with continuous or intermittent flow.

Figure 2:
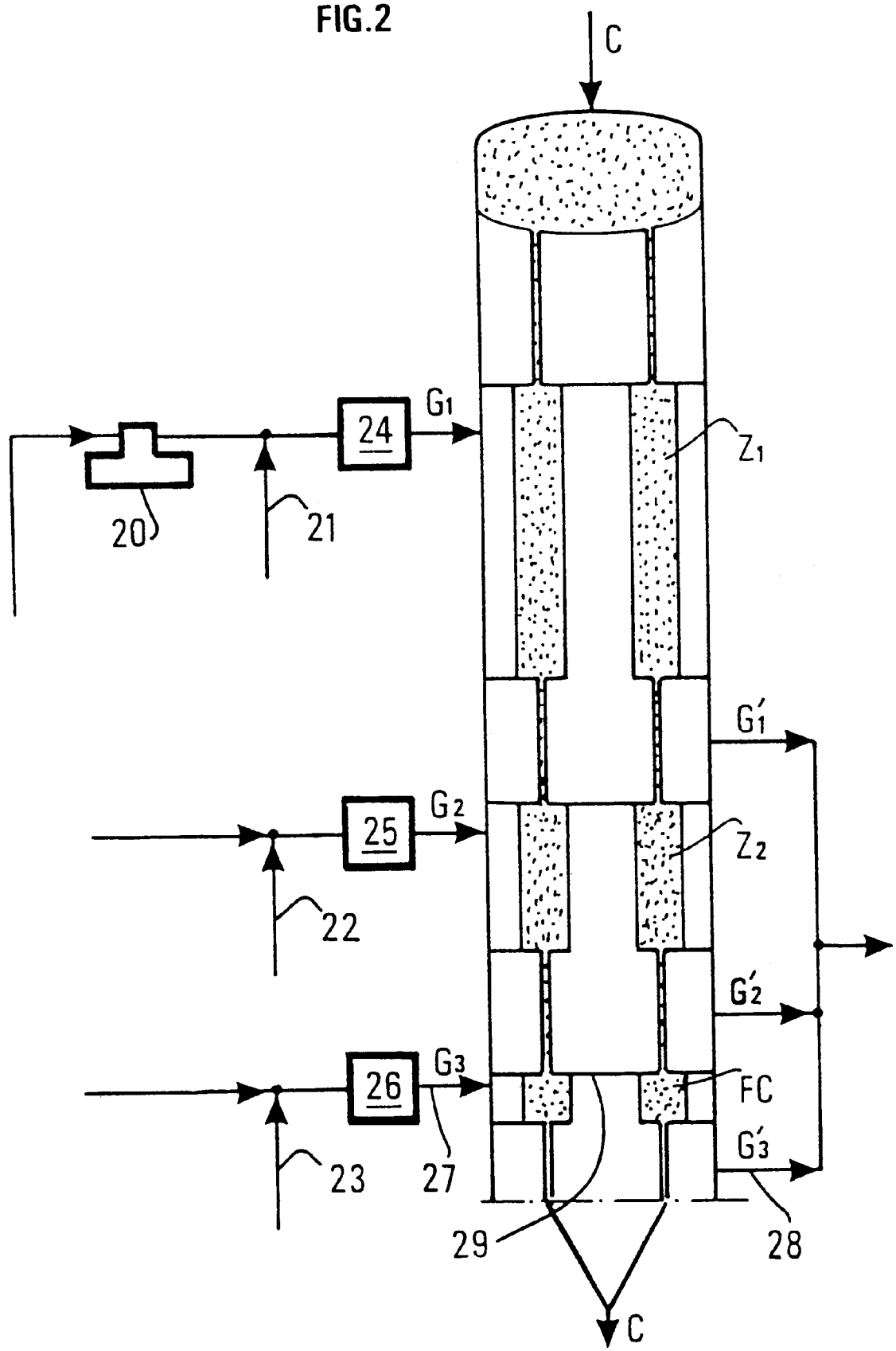
Figure 4:
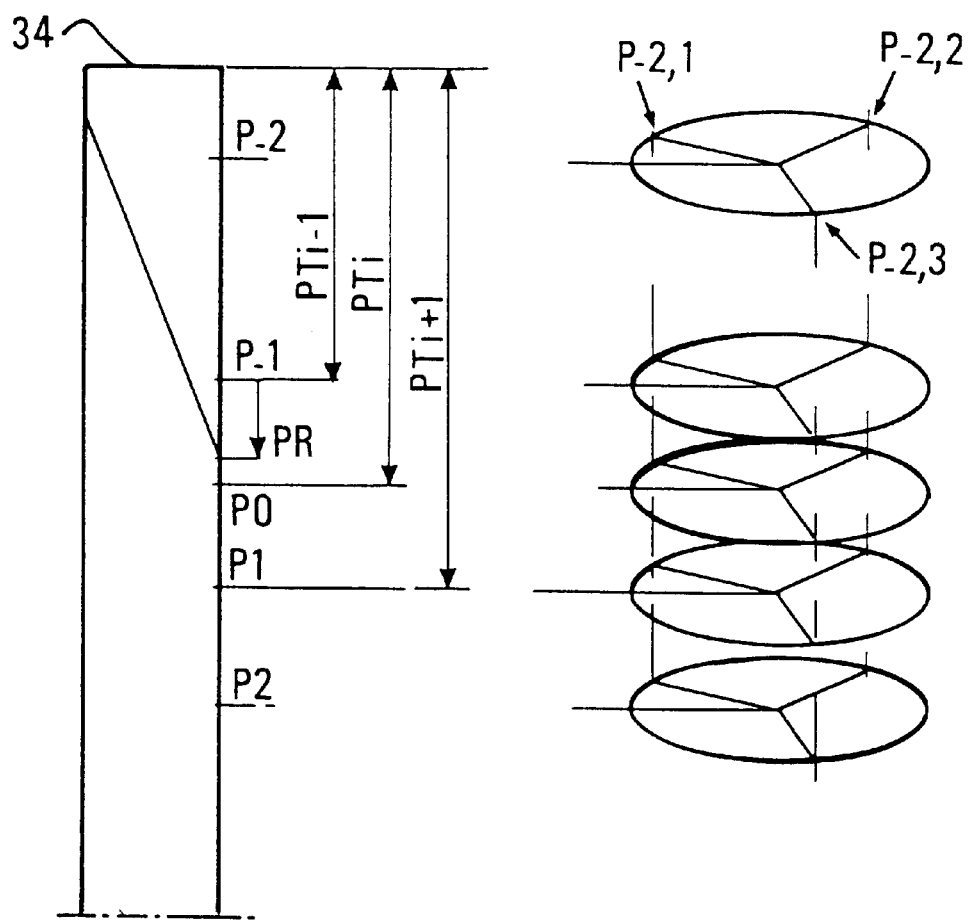
Figure 3:
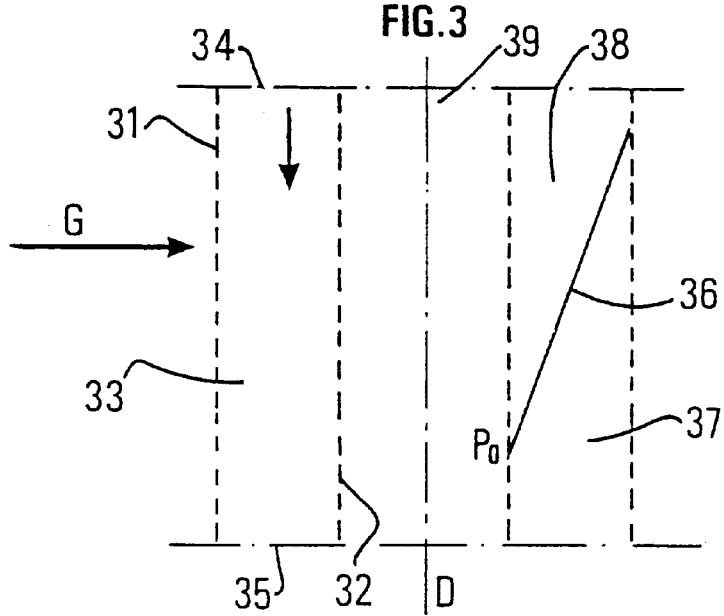

The invention is illustrated in the accompanying drawings, in which:

FIG. 1: is a monitoring and control zone included in the last combustion zone with a moving catalyst bed;

FIG. 2: is a monitoring and control zone after a combustion zone, with a moving catalyst bed;

FIG. 3: is the position of the flame front;

FIG. 4: is the measurement of the position of the flame front.

FIG. 1 only shows the combustion step of a regeneration process, which in this case is carried out in two steps in two distinct zones, for example as described in EP-A-0 378 482. In known fashion, used catalyst C to be regenerated enters the top (2) of regeneration vessel E via a conduit (1).

The catalyst is then introduced via one or more conduits (3) (for example shafts) into a first combustion zone Z1. In this zone, the catalyst undergoes a first burn or combustion using an oxygen-containing gas G1 (introduced via conduit (4)) which passes through walls (5a) and (5b), for example screens, between which the catalyst is contained.

The combustion zones are generally radial, preferably annular in the case of the moving bed shown in FIG. 1.

In the case of a moving bed of catalyst, flow is continuous. Intermittent flow can also be envisaged.

Catalyst C then descends via one of more conduits (6) (for example shafts) into the second combustion zone Z2, into which an oxygen-containing gas G2 is introduced via a pipe (7).

After passage through this second combustion zone, gas G'2 is extracted from the zone via conduit (9). Catalyst C then drops via conduits (10), (for example shafts) to the oxychlorination zone, not shown here. It is treated after combustion in known manner to regenerate it (oxychlorination, calcining).

FIG. 1 shows two successive combustion zones, the number of combustion zones being selected by the skilled person as a function of the unit to be designed. They operate and are arranged in the same way as the zones described above.

Some processes (such as those described in U.S. Pat. No. 4,578,370) function with a single combustion zone into which one or more oxygen-containing gas streams enter at one or more points.

The invention is suitable for any number of combustion zones, as long as one is present. As an example, the gases circulate radially to the flow of catalyst (as shown in the Figures, for example).

In FIG. 1, the regeneration process thus comprises two combustion steps and, immediately before it leaves the combustion zone and before entering the subsequent treatment zones, the catalyst undergoes a monitoring and control step.

This operation is carried out in the lower portion (in the direction of flow of catalyst) of the last combustion zone Z2. In this lower portion a zone FC for monitoring and controlling the end of combustion is located. Under normal conditions, no combustion occurs in this lower portion, in other words it is located after the end of the combustion front (flame front).

In general, monitoring and control zone FC is situated in the lower half of the last combustion zone, preferably in the lower third. It is important to reduce the monitoring and control zone with respect to the combustion zone; thus a monitoring and control zone located in the lower 20% of the combustion zone, or preferably the lower 15%, is suitable. Monitoring and control is thus carried out beyond the end of the flame front which is located up to at most 98%, or 95% or at most 80% of the height of the combustion zone.

Thus, as shown in FIG. 1, the catalyst undergoes at least one combustion step carried out in at least one combustion zone, into which at least one oxygen-containing gas is introduced, and the catalyst undergoes a step for monitoring and controlling the end of combustion in a monitoring and control zone which is located in the lower portion of the last combustion zone, the monitoring and control gas being introduced into the monitoring and control zone. The temperature and/or oxygen content of the gas leaving the zone are preferably measured, but the temperature in the moving bed of catalyst or the temperature of the catalyst can also be measured.

In the embodiment shown in FIG. 2, the monitoring and control zone FC is a zone which is not included in the last combustion zone Z2, but is separate therefrom.

The separation between zone FC and the combustion zone of the last combustion zone prevents the passage of gas between these zones but allows catalyst to pass. The skilled person can select suitable means, for example a plate (29) as shown in FIG. 2.

The combustion zones may be separate (see FIG. 2) or not separate (FIG. 1).

A gas G3 containing oxygen enters zone FC via conduit (11) in FIG. 1 (and (27) in FIG. 2), and the gas extracted after passing through zone FC leaves via conduit (9) in FIG. 1, via which gas G'2 which has passed through combustion zone Z2 is also extracted, or via conduit (28) in FIG. 2, independently of G'2 (gas G'3).

Thus, as shown in FIG. 2, the catalyst undergoes at least one combustion step carried out in at least one combustion zone, into which at least one oxygen-containing gas is introduced, and the catalyst undergoes a step for monitoring and controlling the end of combustion in a monitoring and control zone separate from the combustion zone or from the last combustion zone to allow the catalyst to pass and to prevent the passage of gas, the monitoring and control gas being introduced into the monitoring and control zone and extracted from the monitoring and control zone. As before, the temperature and/or oxygen content of the extracted gas is preferably measured.

In one method of rendering the operating conditions in the monitoring and control zone severe with respect to the combustion zones, the gas introduced for the monitoring and control step, introduced to zone FC in FIGS. 1 and 2, has a quantity of oxygen at least equal to and preferably higher than the largest quantity of oxygen introduced into the combustion step.

In other words, referring to FIGS. 1 and 2, the quantity of oxygen entering with gas G3 is equal to or greater than that entering with gas G1 and with gas G2. If the flow rates are equal, the oxygen content of G3 is higher than that of G1 and G2.

In a further method, taken alone or combined with the preceding method, the temperature of the gas introduced is preferably also at least equal to the highest temperature of the gases introduced into the combustion step. It is preferably substantially equal to the temperature at the end of the last combustion step. In FIG. 2, gas G3 generally enters at a temperature close to that at which effluent G'2 leaves the second combustion zone. In FIG. 1, the temperature of gas G3 is generally close to that of G'2 of the effluent leaving the second combustion zone including zone FC. Gas G3 is generally at a temperature close to that in the moving bed of catalyst leaving the last combustion zone.

In an advantageous implementation for optimising gas management, the effluent leaving G'2 is cooled, impurities are eliminated, it is purged, compressed and preferably all or a portion of the gas is dried before or after compressing. The gas is fractionated into two portions, one being recycled to the combustion step and the other being sent as gas G3 to zone FC after possible addition of oxygen and possible re-heating. Thus, in general, gas G3 comprises at least a portion of the gas from the last combustion step, preferably all, with added oxygen (it being understood that it may be an oxygen-containing gas such as air).

Monitoring and control zone FC is distinguished from a combustion zone in that the oxygen consumption in zone FC is less than 10% of the incoming oxygen, advantageously at most 5% of the incoming oxygen. In general, the temperature remains substantially constant. This means than combustion is complete.

One method of measuring the temperature(s) in the monitoring and control zone is to provide, for example, one or more thermocouples in the central collector (defined by inner wall (5a) in FIG. 1) and in zone FC. The average temperature of the gas leaving zone FC is thus known, which can be compared with that of the gas entering zone FC.

If the gas were to circulate in the opposite direction to that shown in FIG. 1, i.e., from inside (the space delimited by the inner wall) to outside, the thermocouples would be positioned at the outer wall (5b).

A further method is to measure the temperature in the catalytic bed or the temperature of the catalyst, for example using a thermocouple nested in the bed.

Any means for measuring temperature is suitable: thermocouple, infrared analyzer . . .

When a moving catalyst bed displaces in a single combustion zone, the same procedure is used to measure the temperature, using measuring means on the wall through which gas leaves zone FC.

In contrast, measurements are easier, and thus monitoring and control is more reliable, if the combustion and monitoring and control zones are separated to allow the catalyst to pass but to prevent gas from passing, since the gas leaves zone FC independently of the other gases. It can thus clearly be seen that U.S. Pat. No. 4,578,370 of the prior art does not have the means necessary to define a monitoring and control zone as in the invention.

Similarly, the skilled person will select a suitable method for measuring oxygen consumption in zone FC. As a simple example, the variation in the oxygen content between the FC zone inlet and outlet can be measured from a variation in the inlet content (at the same total gas flow rate) and from measuring the variation in the content at the zone outlet. In general, if the preceding stages (zones) are operating correctly, the oxygen consumption in zone FC is low (less than 2–3%, for example).

This measurement method is particularly suitable when zone FC is included in the last combustion zone and the last combustion zone is separate from the preceding combustion zone so that combustion gases from the last zone do not pass into the preceding combustion zone. The method is also readily adaptable for the separate zone FC of FIG. 2.

Thus simple methods for monitoring and controlling proper combustion are available, and errors in combustion can be corrected by varying the temperature or the oxygen content in at least one combustion zone.

In the process, then, the temperatures of the gas and/or catalyst introduced and the gas and/or catalyst leaving the monitoring and control step and/or the oxygen contents of the gas introduced and the gas leaving the monitoring and control step are measured, then compared, and if there is a difference which is larger than the allowable variations, at least one operating condition of at least one combustion step is modified so as to correct that difference.

(A method for carrying out combustion monitoring and control will be described below, from a knowledge of progress of combustion obtained by identifying the position of the flame front).

Preferably, the temperature or oxygen content of the introduced and leaving gases are compared. A further possible comparison is between the temperatures of the catalytic bed or the catalyst entering and leaving the monitoring and control zone.

If the temperature difference does not exceed 3%, or 2% of the entering gas temperature (excluding determinable heat losses), or if the difference in oxygen content is less than 10% of the oxygen content of the incoming gas (this can, if desired be rendered more strict at at most 5%), then the combustion reaction can be considered to be complete (since the difference is within the limit of the allowable variations).

In the contrasting case (difference larger than the allowable variations), combustion finishing is carried out (with operating conditions which are modified with respect to normal operation) to guarantee appropriate regeneration of the catalyst but in the same time, at least one operating condition in at least one combustion zone is modified so that the oxygen consumption in the monitoring and control zone remains below 10%.

Combustion dysfunction will be rapidly detected and quickly remedied. The observed dysfunction will thus be brief. At that moment, under the severe conditions of the zone, combustion finishing will occur.

To treat reforming catalysts or aromatic compound production catalysts, the conditions for the gas entering the monitoring and control step are a temperature of 400–550° C., generally at least 450° C., preferably at least 460° C., and frequently 460° C. to 480° C. or more. The oxygen content is at most 2%, preferably 0.5–1.5%, and preferably higher than the gas contents entering the combustion zone.

The invention is also applicable to a fixed bed regeneration mode. A plurality of beds or a single bed can be used, and the oxygen-containing gas can be supplied to a plurality of points in the bed or outside the bed.

The fixed bed catalyst is subjected to an oxygen-containing gas supplied via a conduit, for example located at the bottom of the bed, and leaving via a further conduit located, for example, at the head of the bed after its passage over the bed.

The conditions prevailing in the reactor allow combustion to be carried out. It may take place in one or more steps. As an example, the temperature and/or the oxygen content of the gas can be increased at a time, in which case combustion is more effective.

When the last combustion step is completed, an oxygen-containing gas in a quantity equal to or preferably greater than the largest quantity of oxygen introduced into a preceding combustion step is introduced (for example higher than that introduced into the second step as described above) is introduced, the gas being introduced at a temperature at least equal to the highest temperature of the gases introduced previously, or advantageously substantially equal to the temperature of the gas leaving the last combustion step.

The temperature and/or the oxygen content of the outgoing gas is measured and compared with the temperatures and/or oxygen content of the incoming gas.

In the same manner as for the moving bed process, the oxygen consumption is checked as to whether it is within the allowable limits of the process.

In the contrasting case (difference larger than allowable variations), a combustion finishing step is implemented (thus with operating conditions which are modified with respect to normal operation) to guarantee suitable regeneration of the catalyst, or a new regeneration cycle is begun under modified conditions. At least one operating condition for combustion of the next batch of the same catalyst is then modified as a consequence to correct the difference.

The skilled person will adapt the temperature and oxygen content conditions of the gas entering the monitoring and control zone as a function of the conditions prevailing in the combustion zones and within the limits defined in the invention.

For regeneration processes operating with a moving catalyst bed, and in particular for the process of the invention, combustion can be highly advantageously monitoring and controlled and regulated by identifying the position of the flame front. One method for achieving this is proposed below.

In this process for monitoring and monitoring and controlling combustion of the carbonized material during regeneration of a catalyst, the catalyst flows in a descending moving bed between at least two walls in a combustion zone, and is traversed by a hot oxygen-containing gas which enters the bed via one of the walls and leaves via the other wall, in which zone a flame front with an inclined profile develops, the highest point of which is on the wall via which the gas enters at the level at which the catalyst enters the zone, and the lowest point of which is on the wall via which the gas leaves. Combustion of the carbonized material in at least one of the zones where combustion takes place is monitored and controlled in this process as follows: at least one parameter XY of the zone in which combustion is complete is measured and at least one parameter XN is measured in a zone in which no combustion occurs, at least one reference point selected close to or on the flame front obtained under normal operating conditions is attributed with a parametric function including XY and XN, the location of said point under normal operating conditions constituting a set reference value, and the position of a dummy point calculated from the parametric function is calculated from measuring points located either side of the reference value, then the position is compared with the set reference point and, if a difference exists, at least one operating condition is modified so as to reduce or eliminate said difference.

The invention will be described with reference to the Figures.

FIG. 3 shows a longitudinal cross section of a combustion zone with an annular bed delimited by 2 coaxial cylindrical walls, an external wall [31] and an inner wall [32]. A gas G enters via the outer wall (a screen in FIG. 3), the oxygen-containing gas, and traverses the moving bed [33] of catalyst, in a downward flow in FIG. 3, entering into the zone via opening [34] (which constitutes the top of the combustion zone) and leaving the combustion zone via opening [35].

The height of the combustion zone is thus h (distance between openings [34] and [35]). The inner wall [32] delimits a central gas collector [39].

The invention is explained here using a gas flow from the outside to the inside, but the opposite flow is possible and the invention is also applicable to this case.

A flame front develops in the combustion zone, i.e., a zone in which the combustion reaction occurs "rapidly".

The flame front is shown as [36] in FIG. 3. Its shape is the result of the following: at the top of the zone, the portion of the bed located near the wall where gas enters burns, and as the catalyst falls continuously, this portion of the catalyst is a little lower and the oxygen present in this region will burn off the coke located a little further from the wall where the gas enters.

The flame front thus has a profile which is inclined downwardly, the highest point of the front is on the wall via which the gas enters (wall [31] in FIG. 3) and at the level of the incoming catalyst (opening [34] in FIG. 3), and the lowest point of the front is on the wall via which the gas leaves (wall [32] in FIG. 3).

The flame front thus separates the catalytic bed into 2 zones: in front of the flame front (zone [37]), the catalyst is no longer coked (or practically no longer coked), and it is "cold", while behind the flame front (zone [38]), it is coked and "hot".

It can be seen that, in order to ensure that practically all of the coke is burned, the lowest point of the flame front (corresponding to completion of combustion) must be located before the end of the combustion zone.

In order to ensure real monitoring and control of the position of the end of the flame front, there must be a certain flexibility in its extreme position, as monitoring and control is a variation about a set value, and the lowest position, the set value, of the flame front can advantageously be set to be at most 98% of height h from the top of the combustion zone, preferably at most 95% or at most 85% or at most 80%. In general, the end of the flame front is located in the lower third of the combustion zone.

The operating conditions in the combustion zone act of the flame front, and thus on the lowest position. The rate of catalyst displacement, and thus its flow rate or the mass flow rate of coke to be burned, the quantity of oxygen introduced (flow rate of gas entering containing oxygen×oxygen content), and the temperature of this gas are the most important parameters.

Experiments and modelling of the combustion reaction carried out by us show that temperature rise and oxygen consumption are concomitant. The indicators of the position of the flame front are thus measurements of temperature or oxygen consumption (direct or calculated).

Knowing the temperature profiles means that the oxygen consumption is known. And knowing the oxygen consumption means the progress of coke combustion is known. Thus the coke combustion progress is known from the temperatures and/or oxygen consumption, which means that knowing the flame front enables the state of combustion to be known.

The following will discuss localisation of the reference point (under normal operating conditions, preferably the lowest point of the flame front) in detail in terms of temperature profiles. (Oxygen consumption profiles could also be used). However, because of the precision of temperature measurements and oxygen concentration measurements carried out on the gas streams entering and leaving the combustion step, it would be foolish to seek to precisely locate the end of the flame front from this information alone.

The location method is explained below, using the lowest point of the flame front selected as the reference point: it is valid for any other point on the flame front. The reference point is close to the flame front or on the flame front, in the zone where there is a high probability that it will develop there under normal conditions.

For normal operation, the operator sets the operating conditions and thus the position P0 of the lowest point of the flame front, and the range of values within which P0 is allowed to vary.

When during operation or startup of the unit normal conditions do not prevail, identification of the lowest point (or any other point) of the flame front can detect this dysfunction and correct it by modifying the operating conditions.

In our case, the reference value will be set as the position of the lowest point on the flame front obtained under normal operating conditions. It is shown in FIG. 4 as P0.

In order to identify that position, measuring points P-1 . . . P-i and P1 . . . Pi are positioned to either side of P0, values P-I being above the set position P0 (towards the top of the combustion zone) and Pi being below P0 (towards the bottom of the combustion zone).

FIG. 4 shows five measuring points (levels) P-2, P-1, P0, P1 and P2. As many as required can be provided. Their spacing is determined by the skilled person and is a function of the desired precision for locating the lowest point of the flame front, the speed required and the correction to be applied; simulation models and experimental measurements can be help in this regard.

These measuring points are advantageously located, as in FIG. 4, at the central collector [39] as they must be located on the side of the wall through which the gas leaves (if the gas flow were in the opposite direction, the measuring points would be on the side of the outer wall) since the selected point (the bottom of the flame front) is located here.

The skilled person will choose the most suitable measuring points for his vessel as a function of the reference point(s) selected.

FIG. 4 shows a disposition in which points P-1, P0 and P1 are relatively close to each other and positioned close to point P0 corresponding to the set value to be adhered to, point P2 is in this case positioned lower in the combustion zone and point P-2 is located higher in the combustion zone. To aid legibility, the points are shown very widely spaced apart and are not to scale; further, point P2 is shown at the bottom of the zone to ease reading, whereas it could be higher.

Thus point P2 provides information regarding temperature TN (or T2) of the outgoing combustion gas when there is no combustion, since it is located beyond the end of the flame front. The temperature indicated is compared with the value of the temperature measured at the inlet to the combustion bed and must be of the same order of magnitude, otherwise it indicates that the position of the flame front is too low. An operator alarm may then be set off.

Point P2 is, for example, located in the lower third of the combustion zone.

Point P2 provides information regarding the outlet temperature TY (or T-2) of the combustion gases when combustion is present, since it is located in a zone of the bed where reaction is always occurring whatever the operating conditions (however, it must not be placed too close to the beginning of the combustion bed to avoid edge effects). Placing this point in a combustion zone can allow the temperature of a section to be measured, which simultaneously provides information on the burning conditions to which the catalyst is subjected (which mainly depend on the percentage of oxygen and the incoming gas temperature) and can also indirectly but reliably locate the flame front as will be shown below. Point P-2 is, for example, located in the upper third of the combustion zone. The section temperature is also an image of the oxygen consumed in the case of complete combustion; thus the information can subsequently be used as a standby with the oxygen concentration information at the inlet. Further, in the case of a low coke percentage, this temperature is the only temperature which can establish whether combustion is occurring normally in a lower portion of the bed (when the end of the flame front is located between P-2 and P-1).

The three points P-1, P0 and P1 are used to provide precise information regarding the location of the end of the flame front or any other point on the flame front selected as the reference point. The positioning of these points corresponds to the zone in which the flame front normally terminates, if the reference point is the lowest point of the flame front.

Thus sensors (for example thermocouples) or any other temperature measurement means (for example infrared analyzers) are located at these measuring points.

These means can be partially or completely located outside the catalytic bed, advantageously where the representative information can be obtained from an outgoing gas, the means thus being close to the wall via which the gas leaves. This is the case when the reference point is the lowest point of the flame front.

These means can be partially located in the catalyst bed.

In addition to or in place of this temperature measurement, the oxygen content can be measured using oxygen analyzers, for example, so as to obtain the oxygen consumption by comparing with the incoming oxygen.

FIG. 4 also shows the disposition of sensors at each measurement point, for example three sensors P-2,1 and P-2,2 and P-2,3 regularly located at point P-2 around a cross section of the central collector. Thus these points measure a section temperature, or an average section temperature can be calculated.

The temperature profile of the combustion bed (of the equipped portion) is simply obtained by taking the average of the temperatures in each transverse section as follows:

$$Tj = \frac{1}{\sum_{i=1}^{3} Vj, i} \sum_{i=1}^{3} Vj, i * Tj, i$$

where:

Tj,i represents the temperature of sensor n° i in section j at point Pj;

Vj,i takes the value 0 if sensor Tj,i is out of order, or 1 if the sensor is operating;

Tj is the average temperature of section j.

This formula simply shows that the average is taken solely from valid sensors.

A sufficiently powerful algorithm which is capable of detecting a flame front can be created as follows from measurements of Tj calculated as above:

Sensor P-2 allows the section temperature to be measured at a position at which complete combustion is present (zone [38]);

Sensor P2 enables the temperature where combustion is absent to be measured (zone [37]);

The flame front is arbitrarily selected as the location where the temperature is equal to a function of the preceding temperatures f(TY, TN), a simple example being the average of the two preceding temperatures.

In this simple case, a simple algorithm enables this position to be found as follows: from the bottom of the bed, find the first temperature above the average of temperatures T2 and T-2. Then interpolate between this temperature and the temperature just preceding the location where the temperature is equal to the average of temperatures T2 and T-2. Then this value can be added to the physical position of the sensor of the first found temperature.

Algorithmically:

(initialisation)(identify two thermocouples around the average temperature)

for $i$=2 to −2 if $Ti$>$(T$−2+$T2)/2$ $PR$=$[(Ti−(T−2+T2)/2)/(Ti−Ti+1)]*(PTi−PTi−1)$

Where

{Ti: average value of thermocouples in section i

PR: position (in metres <0) with respect to PTi

PTi: Position (in metres) of sensor Pi which measures Ti with respect to top of combustion zone}

(estimation of the position of the flame front by linear interpolation, from the top of the combustion zone)

$LI$=$PTi+PR$ (in $SI$ units)

$LI$=$(PTi+PR)$/(length of combustion zone)*100 (in %)

Other algorithms can be envisaged, for example the dummy value of the end of the flame front can be evaluated from a linear combination of T-2, T-1, T0, T1, T2. In general, the dummy position will be defined by a pre-determined function of accessible temperature measurements Ti.

The process of the invention for monitoring and control of combustion is thus based on knowing a dummy point defined, for example, as having a temperature equal to the average of the temperatures in the total combustion zone and in the zone in the absence of combustion. This dummy point is known to be a good approximation to the real location of the lowest point of the flame front.

The monitoring and control process using the temperature parameter has been described above; a further parameter is oxygen consumption.

Regulation by modifying at least one operating condition, preferably the quantity of oxygen entering the combustion zone, can then be carried out if the dummy point calculated above is outside the range of values about point P0 tolerated by the user.

EXAMPLE OF REGULATION SCENARIOS

The dummy point is at P0: the flame front is at the desired position. The set value is kept at the constant $O_2$ flow rate.

The dummy point is between P-1 and P-2: $O_2$ is in excess. Either the end of the flame front is returned to P0 by reducing the quantity of oxygen, or it is left as it is if the dummy point is at P-1, for example.

Depending on the range of values tolerated by the operator, the front can be raised to level P-2.

The dummy point is between P0 and P1: there is not enough $O_2$. The $O_2$ flow rate must be increased.

When the flame front is too high, the lower limit of the capacity of the regenerator to be controlled is reached. This must be indicated by an alarm, and possibly a degraded combustion mode is entered.

When the flame front is too low, the upper limit of the capacity of the regenerator is reached. An alarm must be provided and there is a possibility of temporary burning in the subsequent zone, for example, the oxychlorination zone.

Thus once this front is located, the position of the dummy point can monitor and control it by conventional PID type regulation (proportional, integral, derivative) or by using more powerful algorithms of the internal model and/or non linear model control type using the combustion model more judiciously.

A process operating with an annular bed was described above in which the two walls were cylindrical and co-axial. A conical bed could also be used (the cross section at the top of the bed being smaller than that at the bottom of the bed) or with a bed in which the outer wall is inclined, as described in U.S. Pat. No. 4,859,643. Further, if the gas circulates from the inner wall to the outer wall (in the opposite direction to that described above), the measuring means are preferably located at the outer wall.

When the unit and process used for regeneration of the catalyst includes a plurality of combustion zones, the monitoring and control method described above is used in the last zone in which combustion takes place. Thus, for example, combustion in the second combustion zone is monitoring and controlled for the regeneration process described in EP-A-0 378 482.

Nevertheless, this monitoring and control can be applied to locate the flame front in any zone in which combustion takes place to thereby regulate combustion in that zone. Highly advantageously, this identification is carried out in the last combustion zone of the process comprising a combustion monitoring and control step.

The present invention also provides a vessel for carrying out the process described above.

In accordance with the invention, a vessel for regenerating a used catalyst comprises at least one combustion zone provided with at least two walls (5a, 5b) between which the catalyst circulates as a moving bed, and is provided with at least one conduit (4) for introducing at least one oxygen-containing gas entering the moving bed via one of the walls and leaving via another wall. It also comprises a zone (FC) for monitoring and controlling the end of combustion located after the end of the flame front in the last combustion zone (Z2) provided with a conduit (11) for introducing a monitoring and control oxygen-containing gas and at least one means for measuring the temperature and/or the oxygen content in the gas and/or the catalyst leaving the monitoring and control zone.

Advantageously, when the catalyst circulates in the annular space defined between two cylindrical walls, one or more measuring means are located on the wall of the monitoring and control zone through which the gas leaves.

In one embodiment, the monitoring and control zone is located in the lower portion of the last combustion zone.

In a further embodiment, the vessel comprises at least one separation means (29) located between the monitoring and control zone and the last combustion zone so as to prevent gas from passing and to allow catalyst to pass, and it also comprised a conduit (28) for gas to leave the monitoring and control zone, and one or more measuring means are located in said outlet conduit (28).

One or more measuring means can also be located in the wall of the monitoring and control zone through which the gas leaves.

The vessel of the invention advantageously comprises an apparatus for carrying out the monitoring and control method by identifying the position of the flame front.

In order to carry out the monitoring and control process described above, an apparatus is provided for monitoring and controlling combustion of the carbonized material in a catalyst during regeneration thereof in a regeneration vessel comprising at least one combustion zone, said zone being provided with at least one opening for catalyst to enter and at least one opening for its evacuation, said catalyst flowing in a moving bed in the combustion zone between at least two walls, one of the walls allowing introduction of a hot oxygen-containing gas into the bed supplied via an opening in the regeneration vessel, the gas which has traversed the bed leaving via the other wall and being evacuated from an opening in the vessel. The apparatus comprises:

at least one means for measuring the temperature TY of a portion of the zone where combustion has occurred;

at least one means for measuring the temperature TN of a portion of the zone where combustion has not occurred;

at least two means for measuring temperatures Tj of the bed located at points Pj between measuring means TY and TN, and located either side of a level P0 in the combustion zone which corresponds to the location of a reference point of the flame front to obtain, under normal operating conditions, a set reference value;

a means for calculating the position of a dummy point corresponding to a point on the flame front, from temperature measurements Tj, TY, TN obtained at points Pj, and for comparing said position with the set reference value;

a means for regulating the operating conditions of the combustion zone connected to the calculation means described above and to means for modifying at least one operating condition.

The means for measuring TN is/are preferably located in the lower third of the combustion zone. Advantageously, the means for measuring TY is/are located in the two upper thirds of the combustion zone.

It is important to ensure that a plurality of temperature measuring means are located at the same measuring level, thus resulting in an average section temperature.

Similarly, when the two walls are cylindrical and co-axial, defining an annular bed of catalyst, with the gas entering via the outer wall and being collected in a collector defined by the inner wall, the temperature measuring means are advantageously located in the collector.

Similarly, when the two walls are cylindrical and co-axial, defining an annular bed of catalyst, with the gas entering the combustion zone via the volume defined by the inner wall, passing through the inner wall to traverse the bed and leaving by the outer wall, the temperature measuring means are advantageously located in the outer wall.

It is also possible for the temperature measuring means to be distributed in the catalyst bed.

A particular advantageous apparatus with detection of the lowest point of the flame front comprises:

at least one means for measuring the temperature TY of a portion of the zone where combustion has occurred, on the wall via which the gas leaves;

at least one means for measuring the temperature TN of a portion of the zone where combustion has not occurred, on the wall via which the gas leaves;

at least two means for measuring temperatures Tj of the bed located at points Pj between measuring means TY and TN, on the wall via which the gas leaves, and located either side of a position P0 in the combustion zone which corresponds to the lowest point of the flame front to obtain, under normal operating conditions, a set reference value;

a means for calculating the position of a dummy point corresponding to a point on the flame front, from temperature measurements Tj, TY, TN obtained at points Pj, and for comparing said position with the set reference value;

a means for regulating the operating conditions of the combustion zone connected to the calculation means described above and to means for modifying at least one operating condition.

The means for modifying at least one operating condition are valves, for example. Temperatures Tj are those of the section at measuring position Pj.

In order to identify a temperature which is representative of what is happening in a section, a plurality of sensors (for example three in FIG. 4) are regularly disposed to obtain, at the same time:

standby information required since testing and replacing the sensors is not possible during operation;

information on the profile of the flows in the regenerator (lack of equilibrium, shaft blockages, preferred paths).

In this case a plurality of measuring means must be provided per section and a plurality of measuring levels must be provided. Thus in the longitudinal direction, there are "columns" of measuring means.

In order to detect the presence of preferred paths, the sum of the distances can be calculated for each of the three "columns" of thermocouples with respect to the average section temperature of the thermocouples, namely:

$$POSi = \frac{1}{\sum_{j=-2}^{2} Vj, i} \sum_{j=-2}^{2} Vj, i*(Tj, i - Tj)$$

where: POSi: represents the average shift with respect to the average thermocouple measurement in the section located in position I.

The preceding examples can be repeated with similar success by substituting the generically or specifically described reactants and/or operating conditions of this invention for those used in the preceding examples.

The entire disclosure of all applications, patents and publications, cited above and below, and of corresponding French applications Nos. 97/04.659 and 97/04.661, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for regenerating a used catalyst containing carbonized material, comprising subjecting the used catalyst to at least one designed combustion step in which the catalyst is brought into contact with at least one oxygen-containing gas under designed combustion operating conditions so as to remove carbon from the catalyst, the improvement comprising subjecting the catalyst which has undergone all of the designed combustion steps to a monitoring and control step, comprising contacting said catalyst in the form of a fixed bed with at least one monitoring and control oxygen-containing gas under conditions which are more severe than those of the designed combustion steps and conducting the monitoring and control step with an oxygen consumption of less than 10% of the oxygen entering with said monitoring and control gas, and wherein the temperatures of the gas and/or the catalyst entering and the gas and/or catalyst exiting the monitoring and control step and/or the oxygen contents of the gas entering and the gas exiting the monitoring and control step are measured and compared and wherein the temperature remains substantially constant during the monitoring and control step.

2. A process according to claim 1, wherein the catalyst is a reforming catalyst or a catalyst for the production of aromatic compounds.

3. A process according to claim 1, wherein the temperature of the monitoring and control gas is higher than that of the gases introduced into the design combustion steps.

4. A process according to claim 1, wherein after passage over the catalyst, the monitoring and control gas leaves the process independently of the other gases leaving the design combustion step or mixed with at least one gas leaving at least one design combustion step.

5. A process according to claim 1, wherein the catalyst undergoes at least one design combustion step carried out in at least one combustion zone, into which at least one oxygen-containing gas is introduced, and the catalyst undergoes a step for monitoring and controlling the end of designed combustion in a monitoring and control zone separate from the design combustion zone or from the last design combustion zone so as to allow the catalyst to pass and to prevent the passage of gas, the monitoring and control gas being introduced into the monitoring and control zone and extracted from said monitoring and control zone, the temperature and/or oxygen content of the extracted gas being measured.

6. A process according to claim 1, wherein the catalyst undergoes at least one design combustion step carried out in at least one design combustion zone, into which at least one oxygen-containing gas is introduced, and the catalyst undergoes a step for monitoring and controlling the end of combustion in a monitoring and control zone which is located in the lower portion of the last combustion zone, the monitoring and control gas being introduced into the monitoring and control zone, and the temperature and/or oxygen content of the gas leaving said zone being measured.

7. A process according to claim 1, further comprising, after said measuring and comparing, altering the operating conditions of at least one design combustion step to achieve a higher degree of regeneration of said catalyst.

8. A process according to claim 1, wherein the quantity of oxygen introduced into the monitoring and control gas is higher than the quantity of oxygen in the gases introduced into the design combustion steps.

9. A process according to claim 1, wherein the temperature of the entering and exiting monitoring and control gases are measured, and if the temperature difference does not exceed 3%, maintaining the operating conditions of the designed combustion steps.

10. A process according to claim 1, wherein the temperatures of the entering and exiting monitoring and control gases are measured, and if the temperature difference exceeds 3%, adjusting the operating conditions of the designed combustion steps so that said temperature difference in the monitoring and control step does not exceed 3%.

11. A process according to claim 1, wherein the oxygen contents of the entering and exiting monitoring and control gases are measured, and if the difference in oxygen content is more than 5%, adjusting the operating conditions of the designed combustion steps so that the difference in oxygen contents in the monitoring and control step is at most 5%.

* * * * *

UNITED STATES PATENT AND TRADEMARK OFFICE
CERTIFICATE OF CORRECTION

PATENT NO.    : 6,506,702 B2
DATED         : January 14, 2003
INVENTOR(S)   : Brunet et al.

It is certified that error appears in the above-identified patent and that said Letters Patent is hereby corrected as shown below:

Column 16,
Line 23, reads "last combustion" should read -- last design combustion --

Signed and Sealed this

Twenty-second Day of June, 2004

JON W. DUDAS
*Acting Director of the United States Patent and Trademark Office*